US006263307B1

(12) United States Patent
Arslan et al.

(10) Patent No.: US 6,263,307 B1
(45) Date of Patent: Jul. 17, 2001

(54) ADAPTIVE WEINER FILTERING USING LINE SPECTRAL FREQUENCIES

(75) Inventors: Levent M. Arslan, Durham, NC (US); Alan V. McCree, Dallas; Vishu R. Viswanathan, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/426,426

(22) Filed: Apr. 19, 1995

(51) Int. Cl.[7] .................................................. G01L 21/02

(52) U.S. Cl. .......................... 704/226; 704/205; 704/230

(58) Field of Search ................................ 395/2.35, 2.28, 395/2.32, 2.36, 2.37, 2.38, 2.78, 2.42

(56) References Cited

PUBLICATIONS

Deller et al., "Discrete–Time Processing of Speech Signals," Prentice–Hall, Inc., pp. 331–333, 506–528, 1987.*
Arslan et al., "New Methods for Adaptive Noise Suppression," ICASSP '95: Acoustics, Speech & Signal Processing Conference, pp. 812–815, May 1995.*
Deller et al. "Discrete–Time Processing of Speech Signals." Prentice–Hall, Inc., pp. 331–333, 1987.*

* cited by examiner

*Primary Examiner*—Fan Tsang
*Assistant Examiner*—Michael N. Opsasnick
(74) *Attorney, Agent, or Firm*—Carlton H. Hoel; W. James Brady; Frederick J. Telecky, Jr.

(57) ABSTRACT

An acoustic noise suppression filter including attenuation filtering with a noise-free estimate based on a codebook of line spectral frequencies.

3 Claims, 7 Drawing Sheets

ADAPTIVE WEINER FILTERING USING LINE SPECTRAL FREQUENCIES

CROSS-REFERENCE TO RELATED APPLICATIONS

Cofiled patent applications with Ser. Nos. 08/424,928, 08/425,125, 08/426,746, and 08/426,427 are copending and disclose related subject matter. These applications all have a common assignee.

BACKGROUND OF THE INVENTION

The invention relates to electronic devices, and, more particularly, to speech analysis and synthesis devices and systems.

Human speech consists of a stream of acoustic signals with frequencies ranging up to roughly 20 KHz; but the band of 100 Hz to 5 KHz contains the bulk of the acoustic energy. Telephone transmission of human speech originally consisted of conversion of the analog acoustic signal stream into an analog electrical voltage signal stream (e.g., microphone) for transmission and reconversion to an acoustic signal stream (e.g., loudspeaker) for reception.

The advantages of digital electrical signal transmission led to a conversion from analog to digital telephone transmission beginning in the 1960s. Typically, digital telephone signals arise from sampling analog signals at 8 KHz and nonlinearly quantizing the samples with 8-bit codes according to the $\mu$-law (pulse code modulation, or PCM). A clocked digital-to-analog converter and companding amplifier reconstruct an analog electrical signal stream from the stream of 8-bit samples. Such signals require transmission rates of 64 Kbps (kilobits per second). Many communications applications, such as digital cellular telehone, cannot handle such a high transmission rate, and this has inspired various speech compression methods.

The storage of speech information in analog format (e.g., on magnetic tape in a telephone answering machine) can likewise be replaced with digital storage. However, the memory demands can become overwhelming: 10 minutes of 8-bit PCM sampled at 8 KHz would require about 5 MB (megabytes) of storage. This demands speech compression analogous to digital transmission compression.

One approach to speech compression models the physiological generation of speech and thereby reduces the necessary information transmitted or stored. In particular, the linear speech production model presumes excitation of a variable filter (which roughly represents the vocal tract) by either a pulse train for voiced sounds or white noise for unvoiced sounds followed by amplification or gain to adjust the loudness. The model produces a stream of sounds simply by periodically making a voiced/unvoiced decision plus adjusting the filter coefficients and the gain. Generally, see Markel and Gray, Linear Prediction of Speech (Springer-Verlag 1976).

More particularly, the linear prediction method partitions a stream of speech samples s(n) into "frames" of, for example, 180 successive samples (22.5 msec intervals for a 8 KHz sampling rate); and the samples in a frame then provide the data for computing the filter coefficients for use in coding and synthesis of the sound associated with the frame. Each frame generates coded bits for the linear prediction filter coefficients (LPC), the pitch, the voiced/unvoiced decision, and the gain. This approach of encoding only the model parameters represents far fewer bits than encoding the entire frame of speech samples directly, so the transmission rate may be only 2.4 Kbps rather than the 64 Kbps of PCM. In practice, the LPC coefficients must be quantized for transmission, and the sensitivity of the filter behavior to the quantization error has led to quantization based on the Line Spectral Frequencies (LSF) representation.

To improve the sound quality, further information may be extracted from the speech, compressed and transmitted or stored along with the LPC coefficients, pitch, voicing, and gain. For example, the codebook excitation linear prediction (CELP) method first analyzes a speech frame to find the LPC filter coefficients, and then filters the frame with the LPC filter. Next, CELP determines a pitch period from the filtered frame and removes this periodicity with a comb filter to yield a noise-looking excitation signal. Lastly, CELP encodes the excitation signals using a codebook. Thus CELP transmits the LPC filter coefficients, pitch, gain, and the codebook index of the excitation signal.

The advent of digital cellular telephones has emphasized the role of noise suppression in speech processing, both coding and recognition. Customer expectation of high performance even in extreme car noise situations plus the demand to move to progressively lower data rate speech coding in order to accommodate the ever-increasing number of cellular telephone customers have contributed to the importance of noise suppression. While higher data rate speech coding methods tend to maintain robust performance even in high noise environments, that typically is not the case with lower data rate speech coding methods. The speech quality of low data rate methods tends to degrade drastically with high additive noise. Noise supression to prevent such speech quality losses is important, but it must be achieved without introducing any undesirable artifacts or speech distortions or any significant loss of speech intelligibility. These performance goals for noise suppression have existed for many years, and they have recently come to the forefront due to digital cellular telephone application.

FIG. 1*a* schematically illustrates an overall system 100 of modules for speech acquisition, noise suppression, analysis, transmission/storage, synthesis, and playback. A microphone converts sound waves into electrical signals, and sampling analog-to-digital converter 102 typically samples at 8 KHz to cover the speech spectrum up to 4 KHz. System 100 may partition the stream of samples into frames with smooth windowing to avoid discontinuities. Noise suppression 104 filters a frame to suppress noise, and analyzer 106 extracts LPC coefficients, pitch, voicing, and gain from the noise-suppressed frame for transmission and/or storage 108. The transmission may be any type used for digital information transmission, and the storage may likewise be any type used to store digital information. Of course, types of encoding analysis other than LPC could be used. Synthesizer 110 combines the LPC coefficients, pitch, voicing, and gain information to synthesize frames of sampled speech which digital-to-analog convertor (DAC) 112 converts to analog signals to drive a loudspeaker or other playback device to regenerate sound waves.

FIG. 1*b* shows an analogous system 150 for voice recognition with noise suppression. The recognition analyzer may simply compare input frames with frames from a database or may analyze the input frames and compare parameters with known sets of parameters. Matches found between input frames and stored information provides recognition output.

One approach to noise suppression in speech employs spectral subtraction and appears in Boll, Suppression of Acoustic Noise in Speech Using Spectral Subtraction, 27 IEEE Tr.ASSP 113 (1979), and Lim and Oppenheim, Enhancement and Bandwidth Compression of Noisy Speech, 67 Proc.IEEE 1586 (1979). Spectral subtraction proceeds roughly as follows. Presume a sampled speech signal s(j) with uncorrelated additive noise n(j) to yield an observed windowed noisy speech y(j)=s(j)+n(j). These are random processes over time. Noise is assumed to be a stationary process in that the process's autocorrelation depends only on the difference of the variables; that is, there is a function $r_N(.)$ such that:

$$E\{n(j)n(i)\}=r_N(i-j)$$

where E is the expectation. The Fourier transform of the autocorrelation is called the power spectral density, $P_N(\omega)$. If speech were also a stationary process with autocorrelation $r_S(j)$ and power spectral density $P_S(\omega)$, then the power spectral densities would add due to the lack of correlation:

$$P_Y(\omega)=P_S(\omega)+P_N(\omega)$$

Hence, an estimate for $P_S(\omega)$, and thus s(j), could be obtained from the observed noisy speech y(j) and the noise observed during intervals of (presumed) silence in the observed noisy speech. In particular, take $P_Y(\omega)$ as the squared magnitude of the Fourier transform of y(j) and $P_N(\omega)$ as the squared magnitude of the Fourier transform of the observed noise.

Of course, speech is not a stationary process, so Lim and Oppenheim modified the approach as follows. Take s(j) not to represent a random process but rather to represent a windowed speech signal (that is, a speech signal which has been multiplied by a window function), n(j) a windowed noise signal, and y(j) the resultant windowed observed noisy speech signal. Then Fourier transforming and multiplying by complex conjugates yields:

$$|Y(\omega)|^2=|S(\omega)|^2+|N(\omega)|^2+2Re\{S(\omega)N(\omega)^*\}$$

For ensemble averages the last term on the righthand side of the equation equals zero due to the lack of correlation of noise with the speech signal. This equation thus yields an estimate, $S\hat{}(\omega)$, for the speech signal Fourier transform as:

$$|S\hat{}(\omega)|^2=|Y(\omega)|^2-E\{|N(\omega)|^2\}$$

This resembles the preceding equation for the addition of power spectral densities.

An autocorrelation approach for the windowed speech and noise signals simplifies the mathematics. In particular, the autocorrelation for the speech signal is given by $$r_S(j)=\Sigma_i S(i)S(i+j),$$

with similar expressions for the autocorrelation for the noisy speech and the noise. Thus the noisy speech autocorrelation is:

$$r_Y(j)=r_S(j)+r_N(j)+c_{SN}(j)+c_{SN}(-j)$$

where $c_{SN}(.)$ is the cross correlation of s(j) and n(j). But the speech and noise signals should be uncorrelated, so the cross correlations can be approximated as 0. Hence, $r_Y(j)=r_S(j)+r_N(j)$. And the Fourier transforms of the autocorrelations are just the power spectral densities, so $$P_Y(\omega)=P_S(\omega)+P_N(\omega)$$

Of course, $P_Y(\omega)$ equals $|Y(\omega)|^2$ with $Y(\omega)$ the Fourier transform of y(j) due to the autocorrelation being just a convolution with a time-reversed variable.

The power spectral density $P_N(\omega)$ of the noise signal can be estimated by detection during noise-only periods, so the speech power spectral estimate becomes $$|S\hat{}(\omega)|^2=|Y(\omega)|^2-|N(\omega)|^2-P_Y(\omega)-P_N(\omega)$$

which is the spectral subtraction.

The spectral subtraction method can be interpreted as a time-varying linear filter $H(\omega)$ so that $S\hat{}(\omega)=H(\omega)Y(\omega)$ which the foregoing estimate then defines as:

$$H(\omega)^2=[P_Y(\omega)-P_N(\omega)]/P_Y(\omega)$$

The ultimate estimate for the frame of windowed speech, $s\hat{}(j)$, then equals the inverse Fourier transform of $S\hat{}(\omega)$, and then combining the estimates from successive frames ("overlap add") yields the estimated speech stream.

This spectral subtraction can attenuate noise substantially, but it has problems including the introduction of fluctuating tonal noises commonly referred to as musical noises.

The Lim and Oppenheim article also describes an alternative noise suppression approach using noncausal Wiener filtering which minimizes the mean-square error. That is, again $S\hat{}(\omega)=H(\omega)Y(\omega)$ but with $H(\omega)$ now given by:

$$H(\omega)=P_S(\omega)/[P_S(\omega)+P_N(\omega)]$$

This Wiener filter generalizes to:

$$H(\omega)=[P_S(\omega)/[P_S(\omega)+\alpha P_N(\omega)]]^\beta$$

where constants $\alpha$ and $\beta$ are called the noise suppression factor and the filter power, respectively. Indeed, $\alpha=1$ and $\beta=\frac{1}{2}$ leads to the spectral subtraction method in the following.

A noncausal Wiener filter cannot be directly applied to provide an estimate for s(j) because speech is not stationary and the power spectral density $P_S(\omega)$ is not known. Thus approximate the noncausal Wiener filter by an adaptive generalized Wiener filter which uses the squared magnitude of the estimate $S\hat{}(\omega)$ in place of $P_S(\omega)$:

$$H(\omega)=(|S\hat{}(\omega)|^2/[|S\hat{}(\omega)|^2+\alpha E\{|N(\omega)|^2\}])^\beta$$

Recalling $S\hat{}(\omega)=H(\omega)Y(\omega)$ and then solving for $|S\hat{}(\omega)|$ in the $\beta=\frac{1}{2}$ case yields:

$$|S\hat{}(\omega)|=[|Y(\omega)|^2-\alpha E\{|N(\omega)|^2\}]^{1/2}$$

which just replicates the spectral subtraction method when $\alpha=1$.

However, this generalized Wiener filtering has problems including how to estimate $S\hat{}$, and estimators usually apply an iterative approach with perhaps a half dozen iterations which increases computational complexity.

Ephraim, A Minimum Mean Square Error Approach for Speech Enhancement, Conf.Proc. ICASSP 829 (1990), derived a Wiener filter by first analyzing noisy speech to find linear prediction coefficients (LPC) and then resynthesizing an estimate of the speech to use in the Wiener filter.

In contrast, O'Shaughnessy, Speech Enhancement Using Vector Quantization and a Formant Distance Measure, Conf.Proc. ICASSP 549 (1988), computed noisy speech formants and selected quantized speech codewords to represent the speech based on formant distance; the speech was resynthesized from the codewords. This has problems including degradation for high signal-to-noise signals because of the speech quality limitations of the LPC synthesis.

The Fourier transforms of the windowed sampled speech signals in systems 100 and 150 can be computed in either fixed point or floating point format. Fixed point is cheaper to implement in hardware but has less dynamic range for a comparable number of bits. Automatic gain control limits the dynamic range of the speech samples by adjusting magnitudes according to a moving average of the preceding sample magnitudes, but this also destroys the distinction between loud and quiet speech. Further, the acoustic energy may be concentrated in a narrow frequency band and the Fourier transform will have large dynamic range even for speech samples with relatively constant magnitude. To compensate for such overflow potential in fixed point format, a few bits may be reserved for large Fourier transform dynamic range; but this implies a loss of resolution for small magnitude samples and consequent degradation of quiet speech. This is especially true for systems which follow a Fourier transform with an inverse Fourier transform.

SUMMARY OF THE INVENTION

The present invention provides speech noise suppression by spectral subtraction filtering improved with filter clamping, limiting, and/or smoothing, plus generalized Wiener filtering with a signal-to-noise ratio dependent noise suppression factor, and plus a generalized Wiener filter based on a speech estimate derived from codebook noisy speech analysis and resynthesis. And each frame of samples has a frame-energy-based scaling applied prior to and after Fourier analysis to preserve quiet speech resolution.

The invention has advantages including simple speech noise suppression.

BRIEF DESCRIPTION OF THE DRAWINGS

The drawings are schematic for clarity.

DESCRIPTION OF THE PREFERRED EMBODIMENTS

Overview

Figure 2:
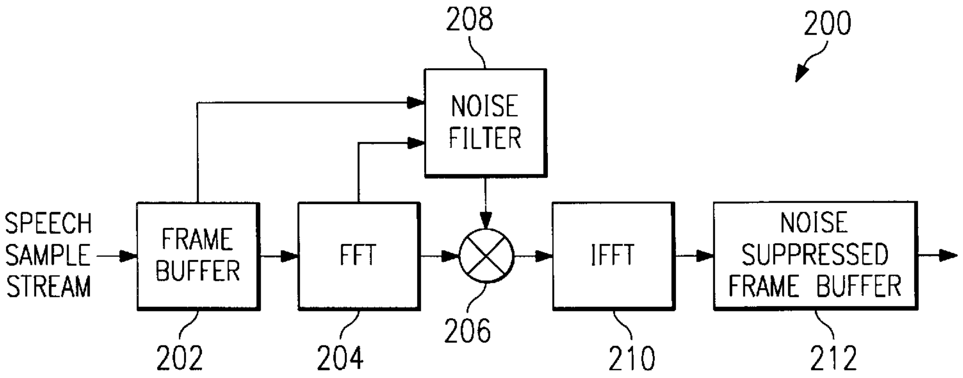
FIG. 2 illustrates a preferred embodiment noise suppression subsystem.

FIG. 2 shows a preferred embodiment noise suppression filter system 200. In particular, frame buffer 202 partitions an incoming stream of speech samples into overlapping frames of 256-sample size and windows the frames; FFT module 204 converts the frames to the frequency domain by fast Fourier transform; multiplier 206 pointwise multiplies the frame by the filter coefficients generated in noise filter block 208; and IFFT module 210 converts back to the time domain by inverse fast Fourier transform. Noise suppressed frame buffer 212 holds the filtered output for speech analysis, such as LPC coding, recognition, or direct transmission. The filter coefficients in block 208 derive from estimates for the noise spectrum and the noisy speech spectrum of the frame, and thus adapt to the changing input. All of the noise suppression computations may be performed with a standard digital signal processor such as a TMS320C25, which can also perform the subsequent speech analysis, if any. Also, general purpose microprocessors or specialized hardware could be used.

The preferred embodiment noise suppression filters may also be realized without Fourier transforms; however, the multiplication of Fourier transforms then corresponds to convolution of functions.

Figure 1A:
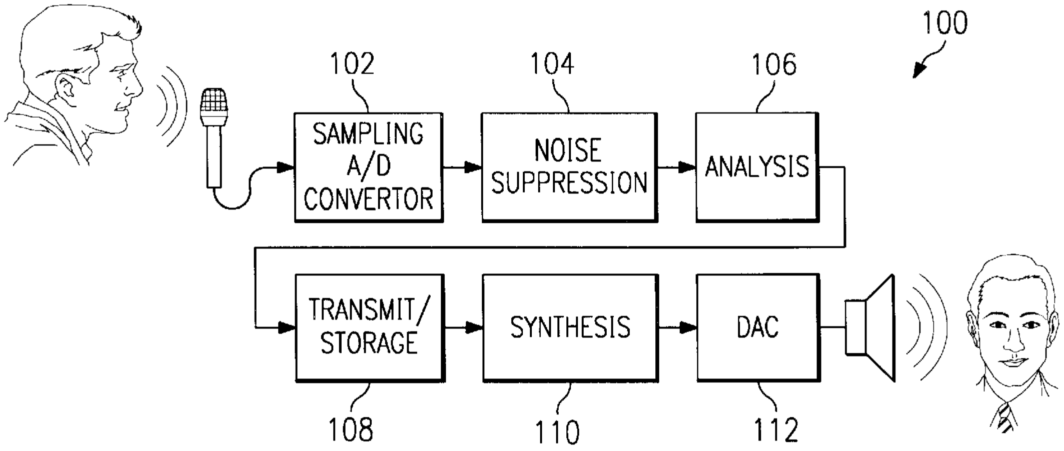
FIGS. 1a–b show speech systems with noise suppression.
Figure 1B:
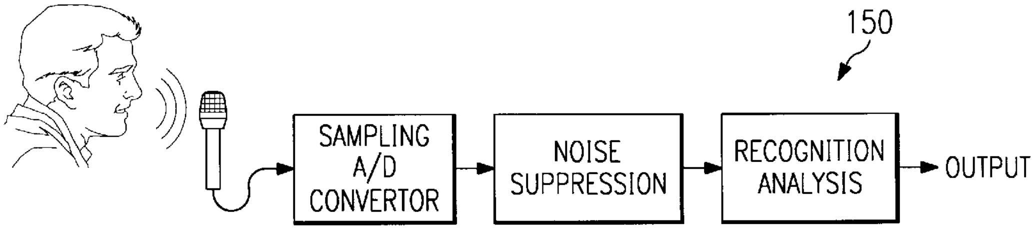

The preferred embodiment noise suppression filters may each be used as the noise suppression blocks in the generic systems of FIGS. 1a–b to yield preferred embodiment systems.

Figure 3:
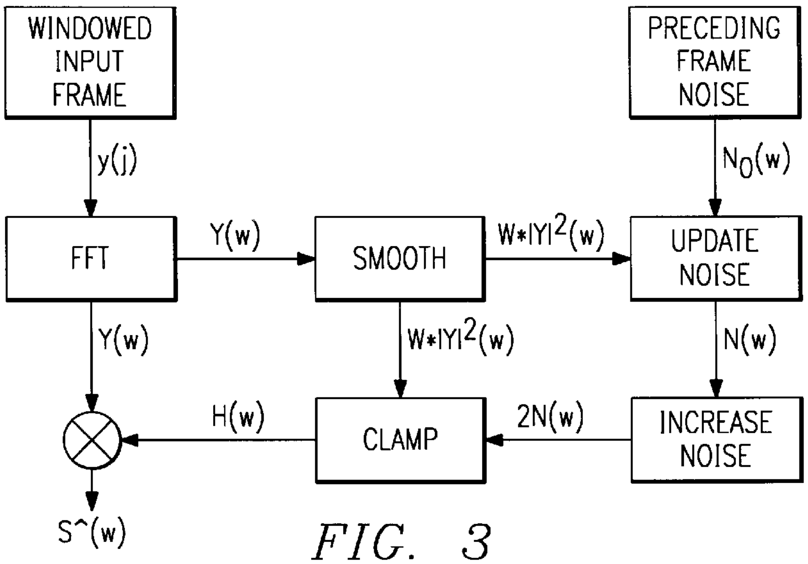
FIGS. 3–5 are flow diagrams for preferred embodiment noise suppression.

The smoothed spectral subtraction preferred embodiments have a spectral subtraction filter which (1) clamps attenuation to limit suppression for inputs with small signal-to-noise ratios, (2) increases noise estimate to avoid filter fluctuations, (3) smoothes noisy speech and noise spectra used for filter definition, and (4) updates a noise spectrum estimate from the preceding frame using the noisy speech spectrum. The attenuation clamp may depend upon speech and noise estimates in order to lessen the attenuation (and distortion) for speech; this strategy may depend upon estimates only in a relatively noise-free frequency band. FIG. 3 is a flow diagram showing all four aspects for the generation of the noise suppression filter of block 208.

Figure 4:
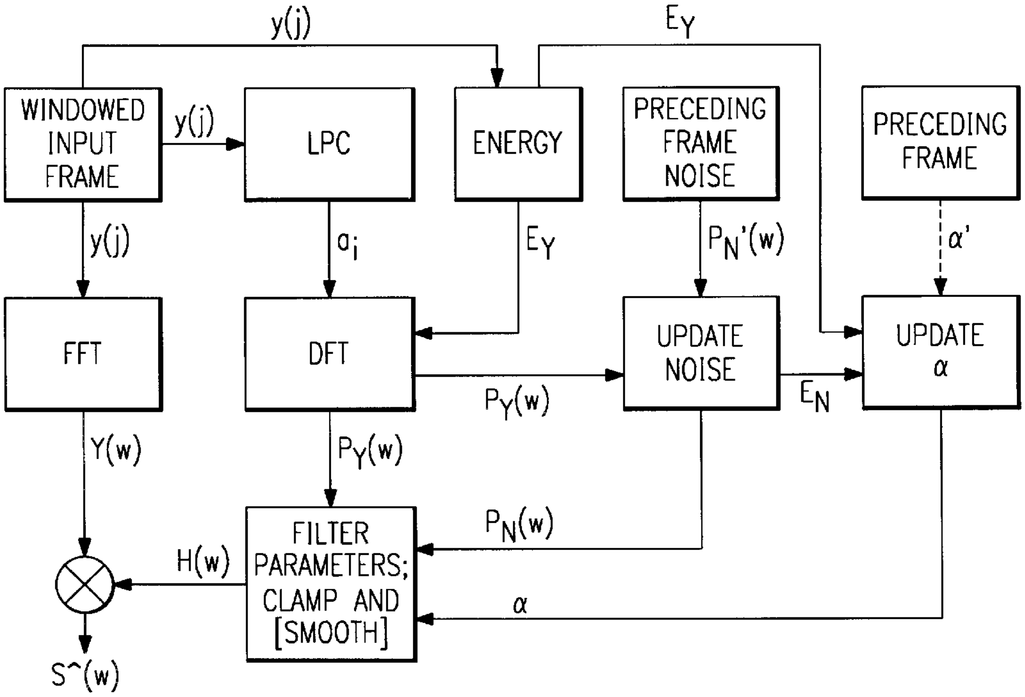

The signal-to-noise ratio adaptive generalized Wiener filter preferred embodiments use $H(\omega)=[P_S\hat{}(\omega)/[P_S\hat{}(\omega)+\alpha P_N(\omega)]]^\beta$ where the noise suppression factor $\alpha$ depends on $E_Y/E_N$ with $E_N$ the noise energy and $E_Y$ the noisy speech energy for the frame. These preferred embodiments also use a scaled LPC spectral approximation of the noisy speech for a smoothed speech power spectrum estimate as illustrated in the flow diagram FIG. 4. FIG. 4 also illustrates an optional filtered $\alpha$.

Figure 5:
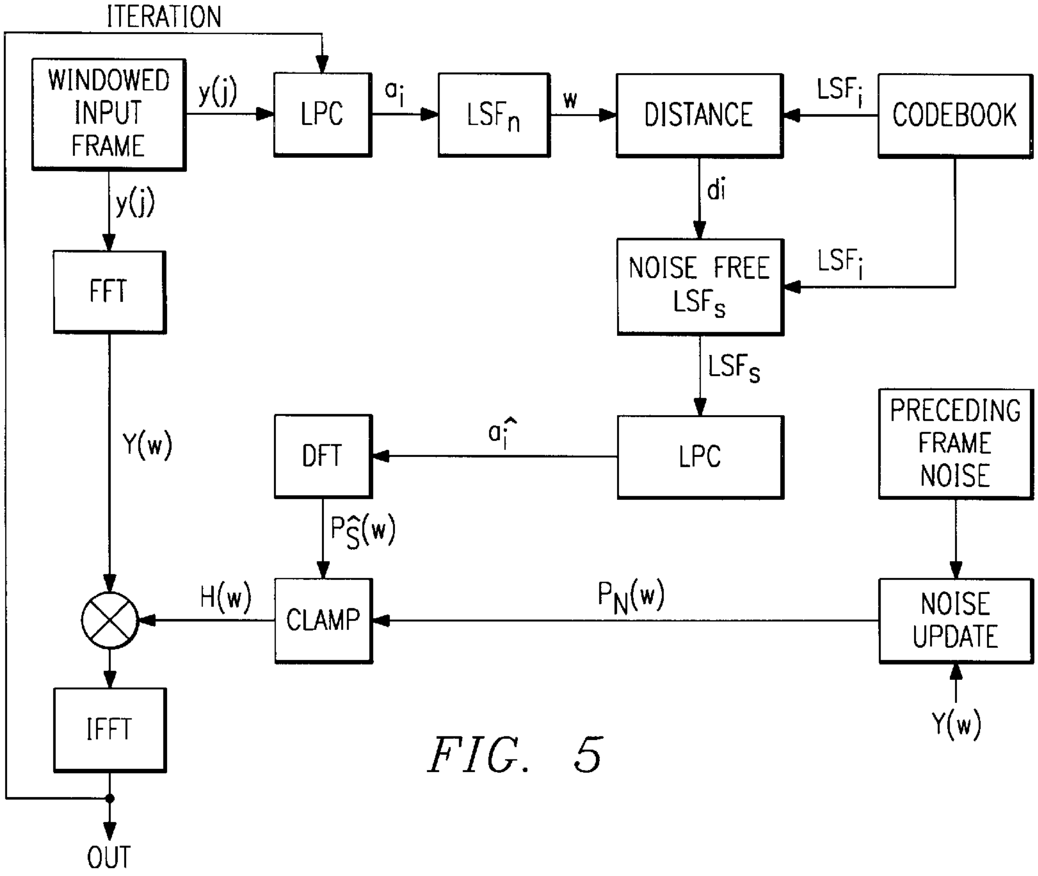

The codebook-based generalized Wiener filter noise suppression preferred embodiments use $H(\omega)=[P_S\hat{}(\omega)/[P_S\hat{}(\omega)+\alpha P_N(\omega)]]^\beta$ with $P_S\hat{}(\omega)$ estimated from LSFs as weighted sums of LSFs in a codebook of LSFs with the weights determined by the LSFs of the input noisy speech. Then iterate: use this $H(\omega)$ to form $H(\omega)Y(\omega)$, next redetermine the input LSFs from $H(\omega)Y(\omega)$, and then redetermine $H(\omega)$ with these LSFs as weights for the codebook LSFs. A half dozen iterations may be used. FIG. 5 illustrates the flow.

Figure 6:
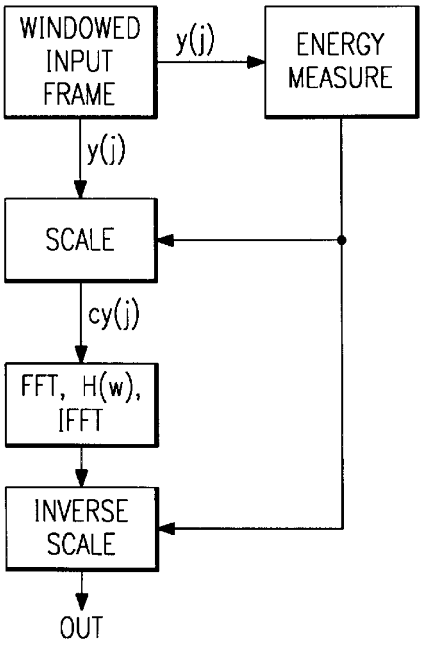
FIG. 6 is a flow diagram for a framewise scaling preferred embodiment.

The power estimates used in the preferred embodiment filter definitions may also be used for adaptive scaling of low power signals to avoid loss of precision during FFT or other operations. The scaling factor adapts to each frame so that with fixed-point digital computations the scale expands or contracts the samples to provide a constant overflow headroom, and after the computations the inverse scale restores the frame power level. FIG. 6 illustrates the flow. This scaling applies without regard to automatic gain control and could even be used in conjunction with an automatic gain controlled input.

Smoothed spectral subtraction preferred embodiments

FIG. 3 illustrates as a flow diagram the various aspects of the spectral subtraction preferred embodiments as used to generate the filter. A preliminary consideration of the standard spectral subtraction noise suppression simplifies explanation of the preferred embodiments. Thus first consider the standard spectral subtraction filter:

$$H(\omega)^2=[|Y(\omega)|^2-|N(\omega)|^2]/|Y(\omega)|^2=1-|N(\omega)|^2/|Y(\omega)|^2$$

Figure 7:
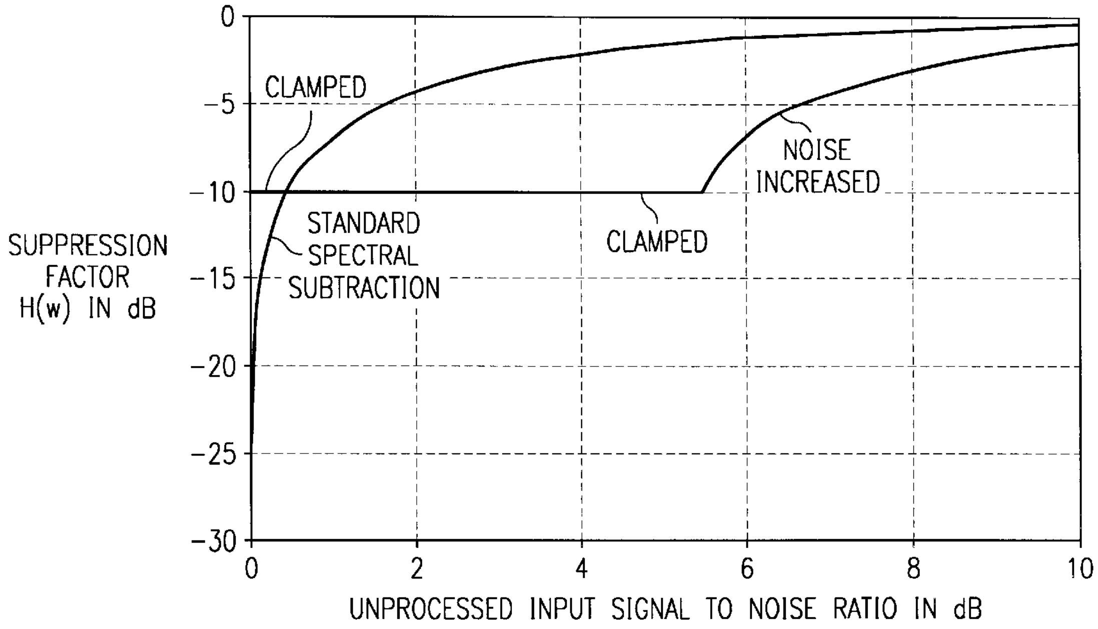
FIGS. 7–8 illustrate spectral subtraction preferred embodiment aspects.
Figure 8:
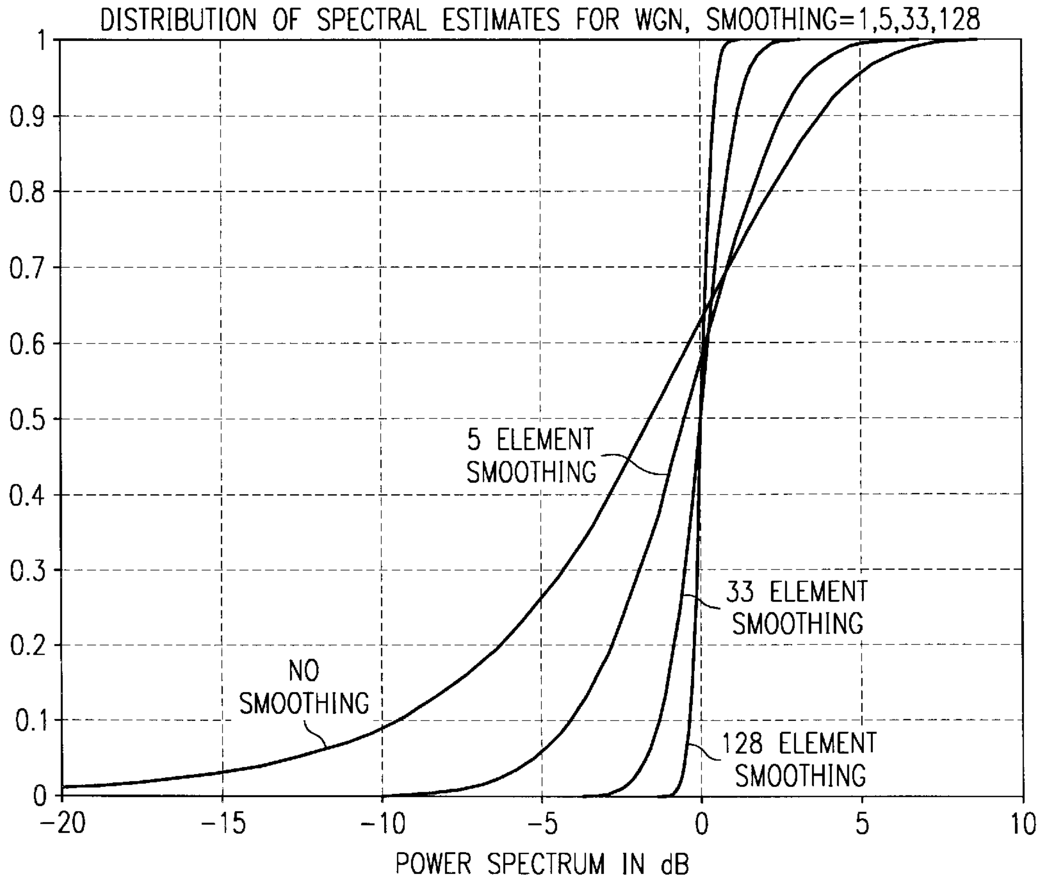

A graph of this function with logarithmic scales appears in FIG. 7 labelled "standard spectral subtraction". Indeed, spectral subtraction consists of applying a frequency-dependent attenuation to each frequency in the noisy speech power spectrum with the attenuation tracking the input signal-to-noise power ratio at each frequency. That is, H(ω) represents a linear time-varying filter. Consequently, as shown in FIG. 7, the amount of attenuation varies rapidly with input signal-to-noise power ratio, especially when the input signal and noise are nearly equal in power. When the input signal contains only noise, the filtering produces musical noise because the estimated input signal-to-noise power ratio at each frequency fluctuates due to measurement error, producing attenuation with random variation across frequencies and over time. FIG. 8 shows the probability distribution of the FFT power spectral estimate at a given frequency of white noise with unity power (labelled "no smoothing"), and illustrates the amount of variation which can be expected.

The preferred embodiments modify this standard spectral subtraction in four independent but synergistic approaches as detailed in the following.

Preliminarily, partition an input stream of noisy speech sampled at 8 KHz into 256-sample frames with a 50% overlap between successive frames; that is, each frame shares its first 128 samples with the preceding frame and shares its last 128 samples with the succeeding frame. This yields an input stream of frames with each frame having 32 msec of samples and a new frame beginning every 16 msec.

Next, multiply each frame with a Hann window of width 256. (A Hann window has the form w(k)=(1+cos(2πk/K))/2 with K+1 the window width.) Thus each frame has 256 samples y(j), and the frames add to reconstruct the input speech stream.

Fourier transform the windowed speech to find Y(ω) for the frame; the noise spectrum estimation differs from the traditional methods and appears in modification (4).

(1) Clamp the H(ω) attenuation curve so that the attenuation cannot go below a minimum value; FIG. 7 has this labelled as "clamped" and illustrates a 10 dB clamp. The clamping prevents the noise suppression filter H(ω) from fluctuating around very small gain values, and also reduces potential speech signal distortion. The corresponding filter would be:

$$H(\omega)^2=\max[10^{-2},\ 1-|N(\omega)|^2/|Y(\omega)|^2]$$

Of course, the 10 dB clamp could be replaced with any other desirable clamp level, such as 5 dB or 20 dB. Also, the clamping could include a sloped clamp or stepped clamping or other more general clamping curves, but a simple clamp lessens computational complexity. The following "Adaptive filter clamp" section describes a clamp which adapts to the input signal energy level.

(2) Increase the noise power spectrum estimate by a factor such as 2 so that small errors in the spectral estimates for input (noisy) signals do not result in fluctuating attenuation filters. The corresponding filter for this factor alone would be:

$$H(\omega)^2=1-4|N(\omega)|^2/|Y(\omega)|^2$$

For small input signal-to-noise power ratios this becomes negative, but a clamp as in (1) eliminates the problem. This noise increase factor appears as a shift in the logarithmic input signal-to-noise power ratio independent variable of FIG. 7. Of course, the 2 factor could be replaced by other factors such as 1.5 or 3; indeed, FIG. 7 shows a 5 dB noise increase factor with the resulting attenuation curve labelled "noise increased". Further, the factor could vary with frequency such as more noise increase (i.e., more attenuation) at low frequencies.

(3) Reduce the variance of spectral estimates used in the noise suppression filter H(ω) by smoothing over neighboring frequencies. That is, for an input windowed noisy speech signal y(j) with Fourier transform Y(ω), apply a running average over frequency so that $|Y(\omega)|^2$ is replaced by $(W\bigstar|Y|^2)(\omega)$ in H(ω) where W(ω) is a window about 0 and ★ is the convolution operator. FIG. 8 shows that the spectral estimates for white noise converge more closely to the correct answer with increasing smoothing window size. That is, the curves labelled "5 element smoothing", "33 element smoothing", and "128 element smoothing" show the decreasing probabilities for large variations with increasing smoothing window sizes. More spectral smoothing reduces noise fluctuations in the filtered speech signal because it reduces the variance of spectral estimation for noisy frames; however, spectral smoothing decreases the spectral resolution so that the noise suppression attenuation filter cannot track sharp spectral characteristics. The preferred embodiment operates with sampling at 8 KHz and windows the input into frames of size 256 samples (32 milliseconds); thus an FFT on the frame generates the Fourier transform as a function on a domain of 256 frequency values. Take the smoothing window W(ω) to have a width of 32 frequencies, so convolution with W(ω) averages over 32 adjacent frequencies. W(ω) may be a simple rectangular window or any other window. The filter transfer function with such smoothing is:

$$H(\omega)^2=1-|N(\omega)|^2/W\bigstar|Y|^2(\omega)$$

Thus a filter with all three of the foregoing features has transfer function:

$$H(\omega)^2=\max[10^{-2},\ 1-4|N(\omega)|^2/W\bigstar|Y|^2(\omega)]$$

Extend the definition of H(ω) by symmetry to π<ω<2π or −π<ω<0

(4) Any noise suppression by spectral subtraction requires an estimate of the noise power spectrum. Typical methods update an average noise spectrum during periods of non-speech activity, but the performance of this approach depends upon accurate estimation of speech intervals which is a difficult technical problem. Some kinds of acoustic noise may have speech-like characteristics, and if they are incorrectly classified as speech, then the noise estimated will not be updated frequently enough to track changes in the noise environment.

Consequently, the preferred embodiment takes noise as any signal which is always present. At each frequency recursively estimate the noise power spectrum $P_N(\omega)$ for use in the filter H(ω) by updating the estimate from the previous frame, $P'_N(\omega)$, using the current frame smoothed estimate for the noisy speech power spectrum, $P_Y(\omega)=W\bigstar|Y|^2(\omega)$, as follows:

$$\begin{aligned} P_N^{\wedge}(\omega) &= 0.978\, P_N'(\omega) && \text{if } P_Y < 0.978\, P_N'(\omega) \\ &= P_Y(\omega) && \text{if } 0.978\, P_N'(\omega) \le P_Y(\omega) \le 1.006\, P_N'(\omega) \\ &= 1.006\, P_N'(\omega) && \text{if } 1.006\, P_N'(\omega) < P_Y(\omega) \end{aligned}$$

For the first frame, just take $P_N^{\wedge}(\omega)$ equal to $P_Y(\omega)$.

Thus, the noise power spectrum estimate can increase up to 3 dB per second or decrease up to 12 dB per second. As a result, the noise estimates will only slightly increase during short speech segments, and will rapidly return to the correct value during pauses between words. The initial estimate can simply be taken as the first input frame which typically will be silence; of course, other initial estimates could be used such as a simple constant. This approach is simple to implement, and is robust in actual performance since it makes no asumptions about the characteristics of either the speech or the noise signals. Of course, multiplicative factors other than 0.978 and 1.006 could be used provided that the decrease limit exceeds the increase limit. That is, the product of the multiplicative factors is less than 1; e.g., (0.978) (1.006) is less than 1.

A preferred embodiment filter may include one or more of the four modifications, and a preferred embodiment filter combining all four of the foregoing modifications will have a transfer function:

$$H(\omega)^2=\max[10^{-2},\ 1-4P_N^{\wedge}(\omega)/W\bigstar|Y|^2(\omega)]$$

with $P_N^{\wedge}(\omega)$ the noise power estimate as in the preceding.

Figure 9A:
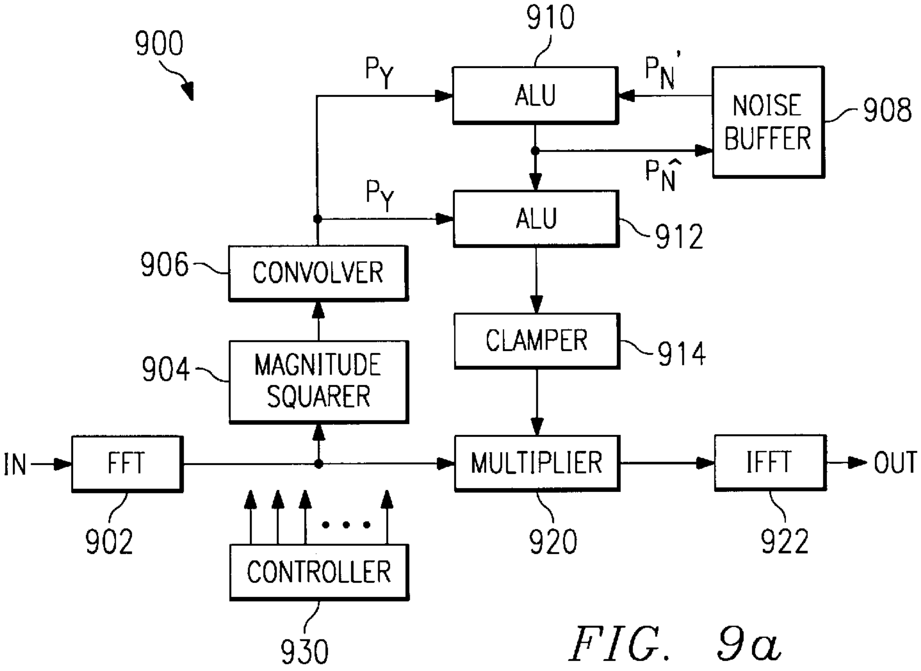
FIGS. 9a–b shows spectral subtraction preferred embodiment systems.

FIG. 9*a* shows in block form preferred embodiment noise suppressor 900 which implements a preferred embodiment spectral subtraction with all four of the preferred embodiment modifications. In particular, FFT module 902 performs a fast Fourier transform of an input frame to give $Y(\omega)$, magnitude squarer 904 generates $|Y(\omega)|^2$, convolver 906 yields $P_Y(\omega)=W\bigstar|Y|^2(\omega)$, noise buffer (memory) 908 holds $P_N'(\omega)$, ALU (arithmetic logic unit plus memory) 910 compares $P_Y$ and $P_N'$ and computes $P_N^{\wedge}$ and updates buffer 908, ALU 912 computes $1-4P_N^{\wedge}(\omega)/P_Y$, clamper 914 computes $H(\omega)$, multiplier 920 applies $H(\omega)$ to $Y(\omega)$, and IFFT module 922 does an inverse Fourier transform to yield the noise-suppression filtered frame. Controller 930 provides the timing and enablement signals to the various components. Noise suppressor 900 inserted into the systems of FIGS. 1*a–b* as the noise suppression blocks provides preferred embodiment systems in which noise suppressor 900 in part controls the output.

Adaptive Filter Clamp

The filter attenuation clamp of the preceding section can be replaced with an adaptive filter attenuation clamp. For example, take $$H(\omega)^2=\max[M^2,\ 1-|N(\omega)|^2/|Y(\omega)|^2]$$

and let the minimum filter gain M depend upon the signal and noise power of the current frame (or, for computational simplicity, of the preceding frame). Indeed, when speech is present, it serves to mask low-level noise; therefore, M can be increased in the presence of speech without the listener hearing increased noise. This has the benefit of lessening the attentuation of the speech and thus causing less speech distortion. Because a common response to having difficulty communicating over the phone is to speak louder, this decreasing the filter attenuation with increased speech power will lessen distortion and improve speech quality. Simply put, the system will transmit clearer speech the louder a person talks.

In particular, let YP be the sum of the signal power spectrum over the frequency range 1.8 KHz to 4.0 KHz: with a 256-sample frame sampling at 8 KHz and 256-point FFT, this corresponds to frequencies $51\pi/128$ to $\pi$. That is, $$YP=\Sigma_\omega P_Y(\omega) \text{ for } 51\pi/128 \leqq \omega \leqq \pi$$

Similarly, let NP be the corresponding sum of the noise power:

$$NP=\Sigma_\omega P_N^{\wedge}(\omega) \text{ for } 51\pi/128 \leqq \omega \leqq \pi$$

with $P_N^{\wedge}(\omega)$ the noise estimate from the preceding section. The frequency range 1.8 KHz to 4.0 KHz lies in a band with small road noise for an automobile but still with significant speech power, thus detect the presence of speech by considering YP−NP. Then take M equal to A+B(YP−NP) where A is the minimum filter gain with an all noise input (analogous to the clamp of the preceding section), and B is the dependence of the minimum filter gain on speech power. For example, A could be −8 dB or −10 dB as in the preceding section, and B could be in the range of ¼ to 1. Further, YP−NP may become negative for near silent frames, so preserve the minimum clamp at A by ignoring the B(YP−NP) factor when YP−NP is negative. Also, an upper limit of −4 dB for very loud frames could be imposed by replacing B(YP−NP) with min[−4 dB, B(YP−NP)].

More explicitly, presume a 16-bit fixed-point format of two's complement numbers, and presume that the noisy speech samples have been scaled so that numbers X arising in the computations will fall into the range $-1 \leqq X < +1$, which in hexadecimal notation will be the range 8000 to 7FFF. Then the filter gain clamp could vary between A taken equal to 1000 (0.125), which is roughly −9 dB, and an upper limit for A+B(YP−NP) taken equal to 3000 (0.375), which is roughly −4.4 dB. More conservatively, the clamp could be constrained to the range of 1800 to 2800.

Furthermore, a simpler implementation of the adaptive clamp which still provides its advantages uses the M from the previous frame (called $M_{OLD}$) and takes M for the current frame simply equal to $(17/16)M_{OLD}$ when $M_{OLD}$ is less than A+B(YP−NP) and $(15/16)M_{OLD}$ when $M_{OLD}$ is greater than A+B(YP−NP).

The preceding adaptive clamp depends linearly on the speech power; however, other dependencies such as quadratic could also be used provided that the functional dependence is monotonic. Indeed, memory in system and slow adaptation rates for M make the clamp nonlinear.

Figure 10A:
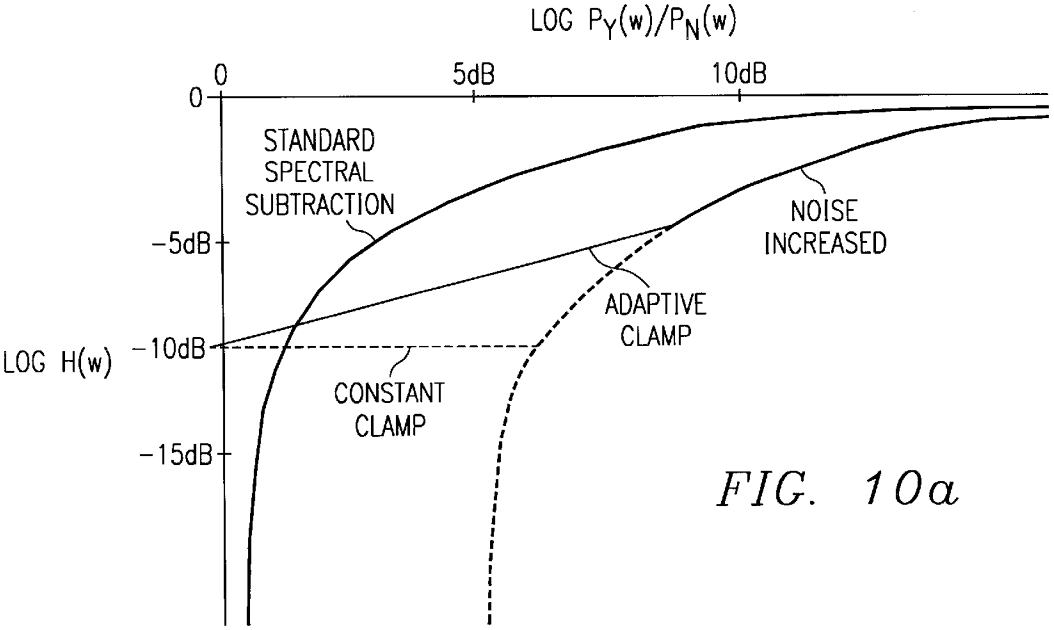
FIGS. 10a–b illustrates spectral subtraction preferred embodiments with adaptive minimum gain clamping.
Figure 10B:
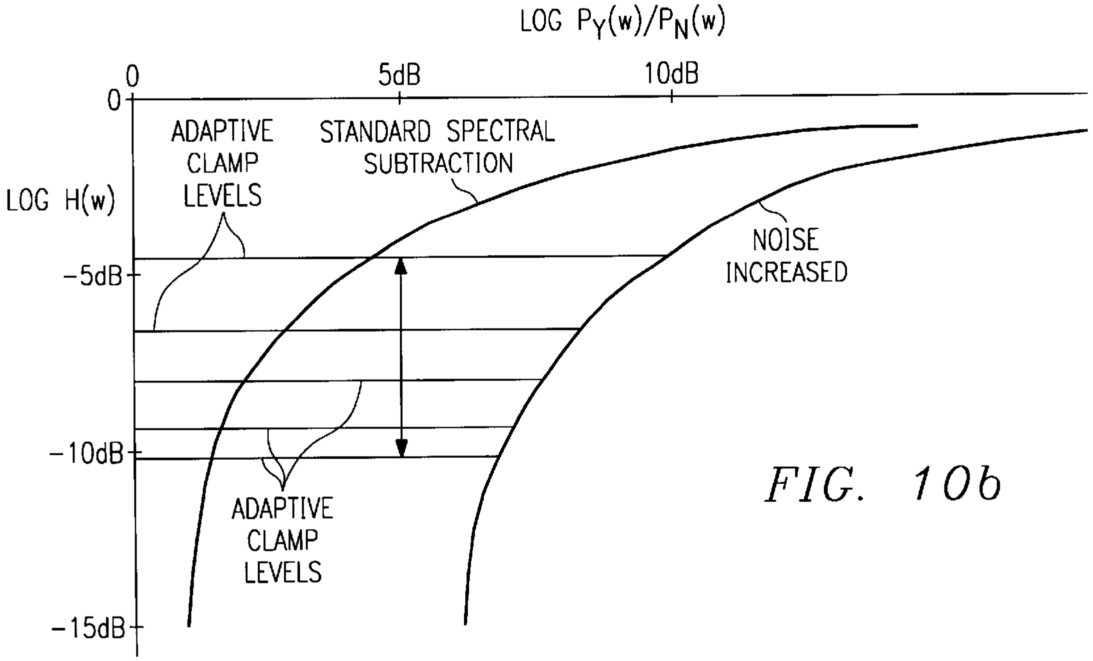

The frequency range used to measure the signal and noise powers could be varied, such as 1.2 KHz to 4.0 KHz or another band (or bands) depending upon the noise environment. FIG. 10*a* heuristically illustrates an adaptive clamp in a form analogous to FIG. 7; of course, the adaptive clamp depends upon the magnitude of the difference of the sums (over a band) of input and noise powers, whereas the independent variable in FIG. 10*a* is the power ratio at a single frequency. However, as the power ratio increases for "average" frequencies, the magnitude of the difference of the sums of input and noise powers over the band also increases, so the clamp ramps up as indicated in FIG. 10*a* for "average" frequencies. FIG. 10*b* more accurately shows the varying adaptive clamp levels for a single frequency: the clamp varies with the difference of the sums of the input and noise powers as illustrated by the vertical arrow. Of course, the clamp, whether adaptive or constant, could be used without the increased noise, and the lefthand portions of the clamp curves together with the standard spectral curve of FIGS. 10*a–b* would apply.

Note that the adaptive clamp could be taken as dependent upon the ratio YP/NP instead of just the difference or on some combination. Also, the positive slope of the adaptive clamp (see FIG. 10*a*) could be used to have a greater attenuation (e.g., −15 dB) for the independent variable equal to 0 and ramp up to an attenuation less than the constant clamp (which is −10 dB) for the independent variable greater than 3 dB. The adaptive clamp achieves both better speech quality and better noise attenuation than the constant clamp.

Note that the estimates YP and NP could be defined by the previous frame in order to make an implementation on a DSP more memory efficient. For most frames the YP and NP will be close to those of the preceding frame.

Figure 9B:
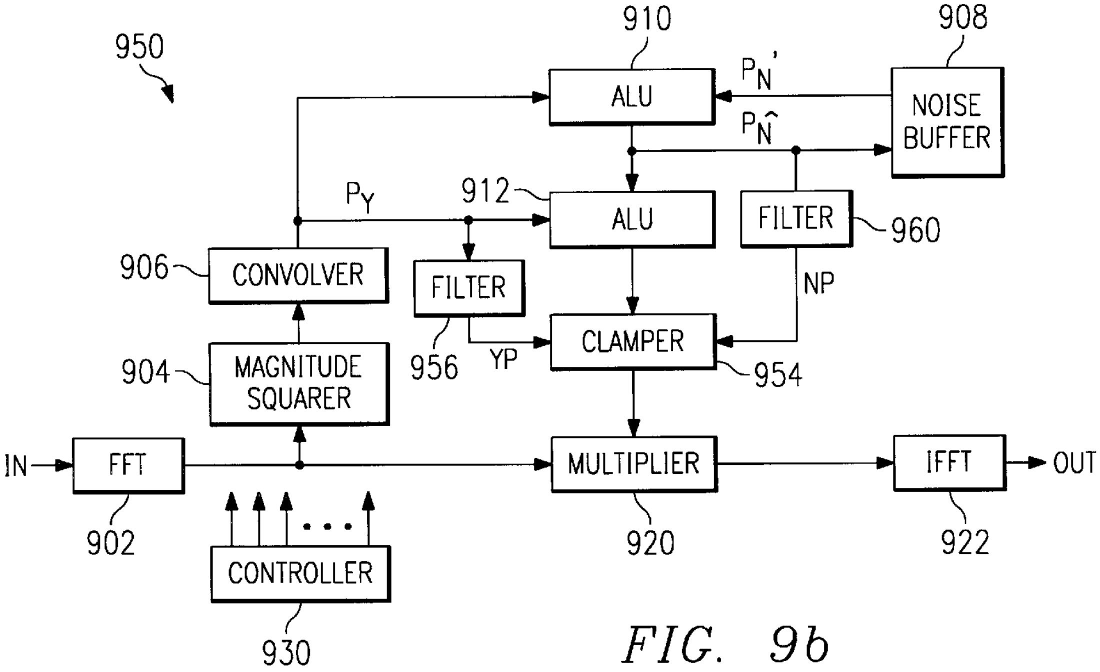

FIG. 9*b* illustrates in block form preferred embodiment noise suppressor 950 which includes the components of system 900 but with an adaptive damper 954 which has the additional inputs of YP from filter 956 and NP from filter 960. Insertion of noise suppressor 950 into the systems of FIGS. 1*a–b* as the noise suppression blocks provides preferred embodiment systems in which noise suppressor 950 in part controls the output.

Modified generalized Wiener filter preferred embodiments

FIG. 4 is a flow diagram for a modified generalized Wiener filter preferred embodiment. Recall that a generalized Wiener filter with power β equal ½ has a transfer function:

$$H(\omega)^2=P_S\hat{}(\omega)/[P_S\hat{}(\omega)+\alpha P_N\hat{}(\omega)]$$

with $P_S\hat{}(\omega)$ an estimate for the speech power spectrum, $P_N\hat{}(\omega)$ an estimate for the noise power spectrum, and α a noise suppression factor. The preferred embodiments modify the generalized Wiener filter by using an α which tracks the signal-to-noise power ratio of the input rather than just a constant.

Heuristically, the preferred embodiment may be understood in terms of the following intuitive analysis. First, take $P_S\hat{}(\omega)$ to be $cP_Y\hat{}(\omega)$ for a constant c with $P_Y\hat{}(\omega)$ the power spectrum of the input noisy speech modelled by LPC. That is, the LPC model for y(j) in some sense removes the noise. Then solve for c by substituting this presumption into the statement that the speech and the noise are uncorrelated ($P_Y(\omega)=P_S(\omega)+P_N(\omega)$) and integrating (summing) over all frequencies to yield:

$$\int P_{Y(\omega)}d\omega=\int cP_Y\hat{}(\omega)d\omega+\int P_N(\omega)d\omega$$

where $P_S\hat{}$ estimated $P_S$.

Thus by Parseval's theorem, $E_Y=cE_Y+E_N$, where $E_Y$ is the energy of the noisy speech LPC model and also an estimate for the energy of y(j), and $E_N$ is the energy of the noise in the frame. Thus, $c=(E_Y-E_N)/E_Y$ and so $P_S\hat{}(\omega)=[(E_Y-E_N)/E_Y]P_Y(\omega)$. Then inserting this into the definition of the generalized Wiener filter transfer function gives:

$$H(\omega)^2=P_Y(\omega)/(P_Y(\omega)+[E_Y/(E_Y-E_N)]\alpha P_N\hat{}(\omega))$$

Now take the factor multiplying $P_N\hat{}(\omega)$(i.e., $[E_Y/(E_Y-E_N)]\alpha$) as inversely dependent upon signal-to-noise ratio (i.e., $[E_Y/(E_Y-E_N)]\alpha=\kappa E_N/E_S$ for a constant κ) so that the noise suppression varies from frame to frame and is greater for frames with small signal-to-noise ratios. Thus the modified generalized Wiener filter insures stronger suppression for noise-only frames and weaker suppression for voiced-speech frames which are not noise corrupted as much. In short, take $\alpha=\kappa E_N/E_Y$, so the noise suppression factor has been made inversely dependent on the signal-to-noise ratio, and the filter transfer function becomes:

$$H(\omega)^2=P_Y(\omega)/(P_Y(\omega)+[E_N/(E_Y-E_N)]\kappa P_N\hat{}(\omega))$$

Optionally, average α by weighting with the α from the preceding frame to limit discontinuities. Further, the value of the constant κ can be increased to obtain higher noise suppression, which does not result in fluctuations in the speech as much as it does for standard spectral subtraction because H(ω) is always nonnegative.

In more detail, the modified generalized Wiener filter perferred embodiment proceeds through the following steps as illustrated in FIG. 4:

(1) Partition an input stream of noisy speech sampled at 8 KHz into 256-sample frames with a 50% overlap between successive frames; that is, each frame shares its first 128 samples with the preceding frame and shares its last 128 samples with the succeeding frame. This yields an input stream of frames with each frame having 32 msec of samples and a new frame beginning every 16 msec.

(2) Multiply each frame with a Hann window of width 256. (A Hann window has the form $w(j)=(1+\cos(2\pi j/N))/2$ with N+1 the window width.) Thus each frame has 256 samples y(j) and the frames add to reconstruct the input speech stream.

(3) For each windowed frame, find the 8th order LPC filter coefficients $a_0$ (=1), $a_1$, $a_2$, . . . $a_8$ by solving the following eight equations for eight unknowns:

$$\Sigma_k a_k r(j+k)=0 \text{ for } j=1,2, \ldots 8$$

where r(.) is the autocorrelation function of y(.).

(4) Form the discrete Fourier transform $A(\omega)=\Sigma_k a_k e^{-ik\omega}$, and then estimate $P_Y(\omega)$ for use in the generalized Wiener filter as $E_Y/|A(\omega)|^2$ with $E_Y=\Sigma_k a_k r(k)$ the energy of the LPC model. This just uses the LPC synthesis filter spectrum as a smoothed version of the noisy speech spectrum and prevents erratic spectral fluctuations from affecting the generalized Wiener filter.

(5) Estimate the noise power spectrum $P_N(\omega)$ for use in the generalized Wiener filter by updating the estimate from the previous frame, $P'_N(\omega)$, using the current frame smoothed estimate for the noisy speech power spectrum, $P_Y(\omega)$, as follows:

$$P_N(\omega) = \begin{cases} 0.978\,P'_N(\omega) & \text{if } P_Y < 0.978\,P'_N(\omega) \\ P_Y(\omega) & \text{if } 0.978\,P'_N(\omega) \le P_Y(\omega) \le 1.006\,P'_N(\omega) \\ 1.006\,P'_N(\omega) & \text{if } 1.006\,P'_N(\omega) < P_Y(\omega) \end{cases}$$

Thus the noise spectrum estimate can increase at 3 dB per second and decrease at 12 dB per second. For the first frame, just take $P_N(\omega)$ equal to $P_Y(\omega)$. And $E_N$ is the integration (sum) of $P_N$ over all frequencies.

Also, optionally, to handle abrupt increases in noise level, use a counter to keep track of the number of successive frames in which the condition $P_Y>1.006\,P'_N(\omega)$ occurs. If 75 successive frames have this condition, then change the mutliplier from 1.006 to $(1.006)^2$ and restart the counter at 0. And if the next successive 75 frames have the condition $P_Y>(1.006)^2\,P'_N(\omega)$, then change the multiplier from $(1.006)^2$ to $(1.006)^3$. Continue in this fashion provided 75 successive frames all have satisfy the condition. Once a frame violates the condition, return to the initial multiplier of 1.006.

Of course, other multipliers and count limits could be used.

(6) Compute $\alpha=\kappa E_N/E_Y$ to use in the generalized Wiener filter. Typically, $\kappa$ will be about 6–7 with larger values for increased noise suppression and smaller values for less. Optionally, $\alpha$ may be filtered by averaging with the preceding frame by:

$$\hat{\alpha}=\max(1, 0.8\alpha+0.2\alpha')$$

where $\alpha'$ is the $\alpha$ of the preceding frame. That is, for the current frame with $E_N$ the energy of the noise estimate $P_N(\omega)$, $E_Y$ the energy of the noisy speech LPC model, and $\alpha'$ is the same expression but for the previous frame. FIG. 4 shows this optional filtering with a broken line.

(7) Compute the first approximation modified generalized Wiener filter for each frequency as:

$$H_1(\omega)^2=P_Y(\omega)/[P_Y(\omega)+[E_Y/(E_Y-E_N)]\alpha P_N(\omega)]$$

with $P_Y(\omega)$ and $E_Y$ from step (4), $P_N(\omega)$ and $E_N$ from step (5), and $\alpha$ from step (6).

(8) Clamp $H_1(\omega)$ to avoid excess noise suppression by defining a second approximation: $H_2(\omega)=\max(-10\text{ dB}, H_1(\omega))$. Alternatively, an adaptive clamp could be used.

(9) Optionally, smooth the second approximation by convolution with a window $W(\omega)$ having weights such as [0.1, 0.2, 0.4, 0.2, 0.1] to define a third approximation $H_3(\omega)=W\bigstar H_2(\omega)$. FIG. 4 indicates this optional smoothing in brackets.

(10) Extend $H_2(\omega)$ (or $H_3(\omega)$ if used) to the range $\pi<\omega<2\pi$ or $-\pi<\omega<0$ by symmetry to define $H(\omega)$. The periodicity of $H(\omega)$ makes these extensions equivalent.

(11) Compute the 256-point discrete Fourier transform of y(j) to obtain $Y(\omega)$.

(12) Take $\hat{S}(\omega)=H(\omega)Y(\omega)$ as an estimate for the spectrum of the frame of speech with noise removed.

(13) Compute the 256-point inverse discrete Fourier transform of $\hat{S}(\omega)$ and take the inverse transform to be the estimate $\hat{s}(j)$ of speech with noise removed for the frame.

(14) Add the $\hat{s}(j)$ of the overlapping portions of successive frames to get s(j) as the final noise suppressed estimate.

Figure 11:
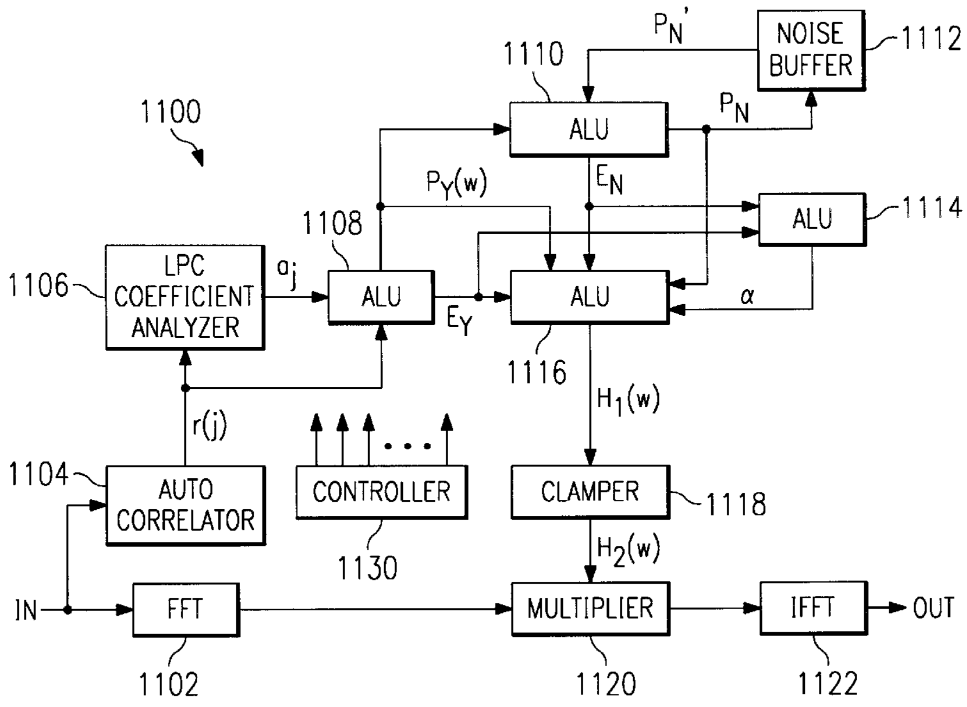
FIG. 11 is a block diagram of a modified Wiener filter preferred embodiment system.

FIG. 11 shows in block form preferred embodiment noise suppressor 1100 which implements the nonoptional functions of a modified generalized Wiener filter preferred embodiment. In particular, FFT module 1102 performs a fast Fourier transform of an input frame to give Y(.) and autocorrelator 1104 performs autocorrelation on the input frame to yield r(.). LPC coefficient analyzer 1106 derives the LPC coefficients $a_j$, and ALU 1108 then forms the power estimate $P_Y(.)$ plus the frame energy estimate $E_Y$. ALU 1110 uses $P_Y(.)$ to update the noise power estimate $P'_N$ held in noise buffer 1112 to give $P_N$ which is stored in noise buffer 1112. ALU 1110 also generates $E_N$, which together with $E_Y$ from ALU 1108, for ALU 1114 to find $\alpha$. ALU 1116 takes the outputs of ALUs 1108, 1110, and 1114 to derive the first approximation $H_1$ and clamper 1118 then yields $H_2$ to be used in multiplier 1120 to perform the filtering. IFFT module 1122 performs the inverse FFT to yield the output filtered frame. Each component has associated buffer memory, and controller 1130 provides the timing and enablement signals to the various components. The adaptive clamp could be used for clamper 1118.

Insertion of noise suppressor 1100 into the systems of FIGS. 1*a–b* as the noise suppression block provides preferred embodiment systems in which noise suppressor 1100 in part controls the output.

Codebook based generalized Wiener filter preferred embodiment

FIG. 5 illustrates the flow for codebook-based generalized Wiener filter noise suppression preferred embodiments having filter transfer functions:

$$H(\omega)^2=\hat{P_S}(\omega)/[\hat{P_S}(\omega)+\alpha \hat{P_N}(\omega)]$$

with $\alpha$ the noise suppression constant. Heuristically, the preferred embodiments estimate the noise $\hat{P_N}(\omega)$ in the same manner as step (5) of the previously described generalized Wiener filter preferred embodiments, and estimate $\hat{P_S}(\omega)$ by the use of the line spectral frequencies (LSF) of the input noisy speech as weightings for LSFs from a codebook of noise-free speech samples. In particular, codebook preferred embodiments proceed as follows.

(1) Partition an input stream of speech sampled at 8 KHz into 256-sample frames with a 50% overlap between successive frames; that is, follow the first step of the modified generalized Wiener filter preferred embodiments.

(2) Multiply each frame with a Hann window of width 256; again following the modified generalized Wiener filter preferred embodiment.

(3) For each windowed frame with samples y(j), find the Mth (typically 8th) order LPC filter coefficients $a_0$ (=1), $a_1, a_2, \ldots a_M$ by solving the M linear equations for M unknowns:

$$\Sigma_i a_i r(j+i)=0 \text{ for } j=1,2, \ldots M$$

where r(.) is the autocorrelation of y(.). This again follows the modified generalized Wiener filter preferred embodiments. The gain of the LPC spectrum is $\Sigma_i a_i r(i)$.

(4) Compute the line spectral frequencies (LSF) from the LPC coefficients. That is, set $P(z)=A(z)+A(1/z)z^M$ and $Q(z)=A(z)-A(1/z)/z^M$ where $A(z)=1+a_1/z+a_2/z^2+\ldots+a_M/z^M$ is the analysis LPC filter, and solve for the roots of the polynomials P(z) and Q(z). These roots all lie on the unit circle $|z|=1$ and so have the form $e^{j\omega}$ with the $\omega$s being the LSFs for the noisy speech frame. Recall that the use of LSFs instead of LPC coefficients for speech coding provides better quantization error properties.

(5) Compute the distance of the noisy speech frame LSFs from each of the entries of a codebook of M-tuples of LSFs. That is, each codebook entry is a set of M LSFs in size order. The codebook has 256 of such entries which have been determined by conventional vector quantiztion training (e.g., LBG algorithm) on sets of M LSFs from noise-free speech samples.

In more detail, let $(LSF_{j,1}, LSF_{j,2}, LSF_{j,3}, \ldots, LSF_{j,M})$ be M LSFs of the jth entry of the codebook; then take the distance of the noisy speech frame LSFs, $(LSF_{n,1}, LSF_{n,2}, LSF_{n,3}, \ldots, LSF_{n,M})$, from the jth entry to be:

$$d_j=\Sigma_i(LSF_{j,i}-LSF_{n,i})/(LSF_{n,i}-LSF_{n,c(i)})$$

where $LSF_{n,c(i)}$ is the noisy speech frame LSF which is the closest to $LSF_{n,i}$ (so c(i) will be either i−1 or i+1 if the $LSF_{n,i}$ are in size order). Thus, this distance measure is dominated by the $LSF_{n,i}$ which are close to each other, and this provides good results because such LSFs have a higher chance of being formants in the noisy speech frame.

(6) Estimate the M LSFs ($LSF_{s,1}$, $LSP_{s,2}$, . . . $LSF_{s,M}$) for the noise-free speech of the frame by a probability weighting of the codebook LSFs:

$$LSF_{s,i}=\Sigma_j p_j LSF_{j,i}$$

where the probabilities $p_j$ derive from the distance measures of the noisy speech frame LSFs from the codebook entries:

$$p_j=\exp(-\gamma d_j)/\Sigma_k \exp(-\gamma d_k)$$

where the constant γ controls the dynamic range for the probabilities and can be taken equal 0.002. Larger values of γ imply increased emphasis on the weights of the higher probability codewords.

(7) Convert the estimated noise-free speech LSFs to LPC coefficients, $a_i\hat{}$, and compute the estimated noise-free speech power spectrum as $$P_S\hat{}(\omega)=\Sigma_i a_i r(i)/|\Sigma_k a_k\hat{}\exp(-jk\omega)|^2$$

where $\Sigma_i a_i r(i)$ is the gain of the LPC spectrum from step (3).

(8) Estimate the noise power spectrum $P_N(\omega)$ as before: see step (5) of the modified generalized Wiener filter section.

(9) Take α equal to 10, and form the filter transfer function $$H_1(\omega)^2=P_S\hat{}(\omega)/[P_S\hat{}(\omega)+\alpha P_N(\omega)]$$

where $P_S\hat{}(\omega)$ comes from step (7) and $P_N(\omega)$ from step (8).

(10) Clamp $H_1(\omega)$ as in the other preferred embodiments to avoid filter fluctuations to obtain the final generalized Wiener filter transfer function: H(ω)=max(−10 dB, $H_1(\omega)$). Alternatively, an adaptive clamp could be used.

(11) Compute the 256-point discrete Fourier transform of y(j) to obtain Y(ω).

(12) Take S^(ω)=H(ω)Y(ω) as an estimate for the spectrum of the frame of speech with noise removed.

(13) Compute the 256-point inverse fast Fourier transform of S^(ω) to be the estimate s^(j) of speech with noise removed for the frame.

(14) Iterate steps (3)–(13) six or seven times using the estimate s^(j) from step (13) for y(j) in step (3). FIG. 5 shows the iteration path

(15) Add the s^(j) of the overlapping portions of successive frames to get s(j) as the final noise suppressed estimate.

Figure 12:
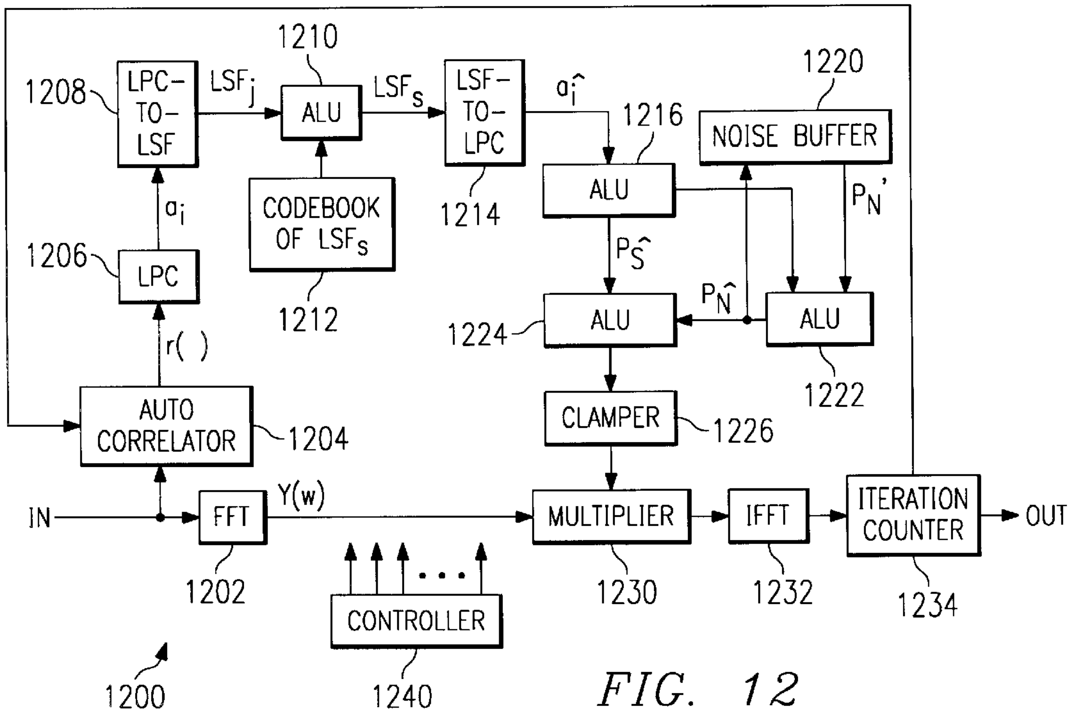
FIG. 12 shows a codebook based generalized Wiener filter preferred embodiment system.

FIG. 12 shows in block form preferred embodiment noise suppressor 1200 which implements the codebook modified generalized Wiener filter preferred embodiment. In particular, FFT 1202 performs a fast Fourier transform of an input frame to give Y(.) and autocorrelator 1204 performs autocorrelation on the input frame to yield r(.). LPC coefficient analyzer 1206 derives the LPC coefficients $a_j$, and LPC-to-LSF converter 1208 gives the LSF coefficients to ALU 1210. Codebook 1212 provides codebook LSF coefficients to ALU 1210 which then forms the noise-free signal LSF coefficient estimates to LSF-to-LPC converter 1214 for conversion to LPC estimates and then to ALU 1216 to form power estimate $P_Y$(.). Noise buffer 1220 and ALU 1222 update the noise estimate $P_N\hat{}$(.) as with the preceding preferred embodiments, and ALU 1224 uses $P_Y$(.) and $P_N\hat{}$(.) to form the first approximation unclapmed $H_1$ and clamper 1226 then yields clamped $H_1$ to be used in multiplier 1230 to perform the filtering. IFFT 1232 performs the inverse FFT to yield the first approximation filtered frame. Iteration counter send the first approximation filtered frame back to autocorrelator 1204 to start generation of a second approximation ilter $H_2$. This second approximation filter applied to Y(.) yields the second approximation filtered frame which iteration counter 1234 again sends back to autocorrelator 1204 to start generation of a third approximation $H_3$. Iteration counter repeats this six times to finally yield a seventh approximation filter and filtered frame which then becomes the output filtered frame. Each component has associated buffer memory, and controller 1240 provides the timing and enablement signals to the various components. The adaptive clamp could be used for damper 1226.

Insertion of noise suppressor 1200 into the systems of FIGS. 1*a*–*b* as the noise suppression blocks provides preferred embodiment systems in which noise suppressor 1200 in part controls the output.

Internal precision control

The preferred embodiments employ various operations such as FFT, and with low power frames the signal samples are small and precision may be lost in multiplications. For example, squaring a 16-bit fixed-point sample will yield a 32-bit result, but memory limitations may demand that only 16 bits be stored and so only the upper 16 bits will be chosen to avoid overflow. Thus an input sample with only the lowest 9 bits nonzero will have an 18-bit answer which implies only the two most significant bits will be retained and thus a loss of precision.

An automatic gain control to bring input samples up to a higher level avoids such a loss of precision but destroys the power level information: both loud and quiet input speech will have the same power output levels. Also, such automatic gain control typically relies on the sample stream and does not consider a frame at a time.

A preferred embodiment precision control method proceeds as follows.

(1) Presume that an (N+1)-bit two's complement integer format for the noisy speech samples u(j) and other variables, and presume that the variables have been scaled to the range $-1\leqq X<+1$. Thus for 16-bit format with hexadecimal notation, variables lie in the range from 8000 to 7FFF. First, estimate the power for an input frame of 256 samples by $\Sigma u(j)^2$ with the sum over the corresponding 256 js.

(2) Count the number of significant bits, S, in the power estimate sum. Note that with |u(j)| having an average size of K significant bits, S will be about 2K+8. So the number of bits in the sum reflects the average sample magnitude with the maximum possible S equal 2N+8.

(3) Pick the frame scaling factor so as to set the average sample size to have (2N+8−S)/2−H significant bits where H is an integer, such as 3, of additional headroom bits. That is, the frame scaling factor is $2^{(2N+8-S)/2-H}$. In terms of the K of step (2), the scaling factor equals $2^{N-K-H}$. For example, with 16-bit format and 3 overhead bits, if the average sample magnitude is $2^{-9}$ (7 significant bits), then the scaling factor will be $2^5$ so the average scaled sampled magnitude is $2^{-4}$ which leaves 3 bits ($2^3$) before overflow occurs at $2^0$.

(4) Apply the Hann window (see steps (1)–(2) of the modified generalized Wiener filter section) to the frame by point wise multiplication. Thus with y(j) denoting the windowed samples, $$y(j)=u(j)(1+\cos(2\pi j/256))/2$$

for the variable j presumed translated into the range −128 to +127. Do this windowing before the scaling to help avoid overflow on the much larger than average samples as they could fail at the edges of the window. Of course, this windowing could follow the scaling of the next step.

(5) Scale the windowed input samples simply by left shifting (2N+8−S)/2−H bits (if the number of bits is negative, then this is a right shift). If a sample has magnitude more than $2^H$ times the average, then overflow will occur and in this case just replace the scaled sample with the corresponding maximum magnitude (e.g., 8000 or 7FFF). Indeed, if the sign bit changes, then overflow has occurred and the scaled sample is taken as the corresponding maximum magnitude. Thus with $y_S(j)$ denoting the scaled windowed samples and no overflow:

$$y_S(j)=y(j)2^{(2N+8-S)/2-H}$$

(6) Compute the FFT using $y_S(j)$ to find $Y_S(\omega)$. The use of $y_S(j)$ avoids the loss of precision which otherwise would have occurred with the FFT due to underflow avoidance.

(7) Apply a local smoothing window to $Y_S(\omega)$ as in step (3) of the spectral substraction preferred embodiments.

(8) Scale down by shifting $Y_S(\omega)$ (2N+8−S)/2−H bits to the right (with the new sign bit repeating the original sign bit) to have $Y(\omega)$ for noise estimation and filter application in the preferred embodiments previously described.

An alternative precision control scaling uses the sum of the absolute values of the samples in a frame rather than the power estimate (sum of the squares of the samples). As with the power estimate scaling, count the number S of significant bits is the sum of absolute values and scale the input samples by a factor of $2^{N+8-S-H}$ where again N+1 is the number bits in the sample representation, the 8 comes from the 256 ($2^8$) sample frame size, and H provides headroom bits. Heuristically, with samples of K significant bits on the average, the sum of absolute values should be about K+8 bits, and so S will be about K+8 and the factor will be $2^{N-K-H}$ which is the same as the power estimate sum scaling.

Further, even using the power estimate sum with S significant bits, scaling factors such as $2^{(2N+8-S)-H}$ have yielded good results. That is, variations of the method of scaling up according to a frame characteristic, processing, and then scaling down will also be viable provided the scaling does not lead to excessive overflow.

Figure 13:
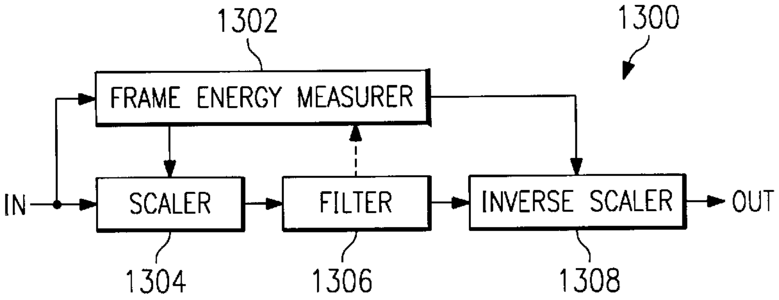
FIG. 13 illustrates a preferred embodiment internal precision control system.

FIG. 13 illustrates in block format a internal precision controller preferred embodiment which could be used with any of the foregoing noise suppression filter preferred embodiments. In particular, frame energy measurer 1302 determines the scaling factor to be used, and scaler 1304 applies the scaling factor to the input frame. Filter 1306 filters the scaled frame, and inverse scaler 1308 then undoes the scaling to return to the original input signal levels. Filter 1306 could be any of the foregoing preferred embodiment filters. Parameters from filter 1306 may be part of the scale factor determination by measurer 1302. And insertion of noise suppressors 1300 into the systems of FIGS. 1*a–b* provides preferred embodiment systems in which noise suppressor 1300 in part controls the output.

Modifications

The preferred embodiments may be varied in many ways while retaining one or more of the features of clamping, noise enhancing, smoothed power estimating, recursive noise estimating, adaptive clamping, adaptive noise suppression factoring, codebook based estimating, and internal precision controlling.

For example, the various generalized Wiener filters of the preferred embodiments had power $\beta$ equal to ½, but other powers such as 1, ¾, ¼, and so forth also apply; higher filter powers imply stronger filtering. The frame size of 256 samples could be increased or decreased, although powers of 2 are convenient for FFTs. The particular choice of 3 bits of additional headroom could be varied, especially with different size frames and different number of bits in the sample representation. The adaptive clamp could have a negative dependence upon frame noise and signal estimates (B<0). Also, the adaptive clamp could invoke a near-end speech detection method to adjust the clamp level. The $\alpha$ and $\kappa$ coefficients could be varied and could enter the transfer functions as simple analytic functions of the ratios, and the number iterations in the codebook based generalized Wiener filter could be varied.

What is claimed is:

1. A method of filtering a stream of sampled acoustic signals, comprising the steps of:

(a) partitioning a stream of sampled acoustic signals into a sequence of frames;

(b) Fourier transforming said flames to yield a sequence of transformed frames;

(c) applying a generalized Wiener filter to said transformed frames to yield a sequence of filtered transformed frames, wherein said filter uses power spectrum estimates from LSFs defined as weighted sums of LSFs of a codebook of LSFs with the weights determined by the LSFs of said transformed frames; and (d) inverse Fourier transforming said sequence of filtered transformed frames to yield a sequence of filtered frames.

2. The method of claim 1, further comprising the steps of:

(a) repeating step (c) of claim 1 but with the LSFs of said transformed frame replaced with the LSFs of the filtered transformed frame of a preceding iteration of said step (c) of claim 1.

3. The method of claim 2, wherein:

(a) said step (c) of claim 1 is repeated a number of times with the number in the range of 6 to 7.

* * * * *